United States Patent
Cohen et al.

(10) Patent No.: US 10,855,886 B2
(45) Date of Patent: Dec. 1, 2020

(54) CUBIFORM METHOD

(71) Applicant: Filmic Inc., Seattle, WA (US)

(72) Inventors: Christopher Cohen, Seattle, WA (US); Daniel Hernández Portugués, Seattle, WA (US); Matthew Voss, Seattle, WA (US)

(73) Assignee: Filmic Inc., Seattle, WA (US)

( * ) Notice: Subject to any disclaimer, the term of this patent is extended or adjusted under 35 U.S.C. 154(b) by 0 days.

(21) Appl. No.: 16/279,921

(22) Filed: Feb. 19, 2019

(65) Prior Publication Data

US 2019/0260908 A1    Aug. 22, 2019

Related U.S. Application Data

(60) Provisional application No. 62/632,848, filed on Feb. 20, 2018.

(51) Int. Cl.
*H04N 1/60* (2006.01)
*G06T 3/40* (2006.01)
*G06T 15/00* (2011.01)

(52) U.S. Cl.
CPC ......... *H04N 1/6025* (2013.01); *G06T 3/4007* (2013.01); *G06T 15/00* (2013.01); *H04N 1/603* (2013.01); *H04N 1/6027* (2013.01); *H04N 1/6036* (2013.01)

(58) Field of Classification Search
None
See application file for complete search history.

(56) References Cited

U.S. PATENT DOCUMENTS

| | | | | |
|---|---|---|---|---|
| 4,929,978 A | * | 5/1990 | Kanamori | H04N 1/60 355/38 |
| 4,941,039 A | * | 7/1990 | E'Errico | H04N 1/6019 358/518 |
| 5,218,647 A | * | 6/1993 | Blonstein | H04N 1/6019 348/472 |
| 5,321,797 A | * | 6/1994 | Morton | G06F 1/03 345/604 |
| 5,731,818 A | | 3/1998 | Wan et al. | |
| 5,982,990 A | * | 11/1999 | Gondek | H04N 1/6019 358/1.9 |
| 5,987,167 A | * | 11/1999 | Inoue | G06T 11/001 358/518 |

(Continued)

OTHER PUBLICATIONS

International Search Report and Written Opinion, dated May 8, 2019 in International Application No. PCT/US19/18814.

*Primary Examiner* — Anh-Vinh T Nguyen
(74) *Attorney, Agent, or Firm* — Davis Wright Tremaine LLP; Heather M. Colburn (57) ABSTRACT

A method performed by a module executing on a computing device. The method includes receiving a request to generate a new color lookup table ("C-LUT"). The request includes at least one parameter value indicating a parameter change input by a user. The request may also indicate a number of data-points in the new C-LUT. The method includes generating a new color value for each of the data-points based on the at least one parameter value. The module appends the new color value for each of the data-points to a data structure and generates the new C-LUT from the data structure. The new color lookup table is operable to replace a current color lookup table.

80 Claims, 4 Drawing Sheets

(56) References Cited

U.S. PATENT DOCUMENTS

| | | | |
|---|---|---|---|
| 6,011,540 A | | 1/2000 | Berlin et al. |
| 6,134,571 A | * | 10/2000 | Kresch ................. G06F 17/147 |
| | | | 382/260 |
| 6,459,425 B1 | * | 10/2002 | Holub ....................... G01J 3/02 |
| | | | 345/207 |
| 7,564,466 B2 | | 7/2009 | Quach |
| 2003/0090726 A1 | * | 5/2003 | Arai ..................... H04N 1/6033 |
| | | | 358/2.1 |
| 2004/0056835 A1 | * | 3/2004 | Curry ..................... H04N 1/646 |
| | | | 345/100 |
| 2004/0223173 A1 | * | 11/2004 | Arai ..................... H04N 1/6025 |
| | | | 358/1.9 |
| 2005/0031199 A1 | * | 2/2005 | Ben-Chorin ............. G09G 5/02 |
| | | | 382/162 |
| 2006/0055835 A1 | * | 3/2006 | Nitta ..................... H04N 1/603 |
| | | | 349/7 |
| 2010/0118008 A1 | | 5/2010 | Matsuoka |
| 2010/0259001 A1 | * | 10/2010 | Muller, III ............ A63F 9/0842 |
| | | | 273/153 S |
| 2013/0208289 A1 | * | 8/2013 | Satoh ..................... G01J 3/021 |
| | | | 358/1.9 |
| 2013/0321675 A1 | * | 12/2013 | Cote ......................... H04N 9/64 |
| | | | 348/242 |
| 2015/0070737 A1 | * | 3/2015 | Hirata ................. H04N 1/6044 |
| | | | 358/504 |
| 2017/0124983 A1 | * | 5/2017 | Atkins ..................... G09G 5/10 |
| 2018/0054603 A1 | * | 2/2018 | Kamiya ............... H04N 1/6019 |
| 2018/0255206 A1 | * | 9/2018 | Kim ..................... H04N 5/2628 |
| 2018/0350322 A1 | * | 12/2018 | Marcu ..................... G09G 5/06 |

* cited by examiner

CUBIFORM METHOD

CROSS REFERENCE TO RELATED APPLICATION(S)

This application claims the benefit of U.S. Provisional Patent Application No. 62/632,848, filed on Feb. 20, 2018, which is incorporated herein by reference in its entirety.

BACKGROUND OF THE INVENTION

Field of the Invention

The present invention is directed generally to methods of modifying images and, more particularly, to methods of creating color lookup tables used to modify images.

Description of the Related Art

A conventional per-pixel mathematical process (encapsulated in one or more Kernel functions) is typically used to modify chrominance and luminance information of an image. Such modifications may be referred to as pixel transform operations. Unfortunately, as the complexity of such pixel transform operations increases, compute time needed to produce the expected result increases as well.

As an alternative to per-pixel processing, a color look-up table ("C-LUT") may be employed. A C-LUT is a data structure (e.g., a matrix, a table, and the like) that stores pre-calculated values. When a C-LUT is used for pixel transform operations, a new value is "looked up" for each of the pixels in the image from the C-LUT. This lookup operation is referred to as remapping the pixels. Using a C-LUT is much more efficient for complex remap operations than per-pixel processing. However, the C-LUT is generally treated like a static data-model and discarded when a different pixel transform operation is desired.

While it is possible to edit a C-LUT, doing so is problematic because of the inherent inefficiency involved in modifying each of the pre-calculated values in a full-sized C-LUT in real-time. For example, no matter how the C-LUT is edited, such editing consumes resources needed to perform other processing tasks. If a graphics processing unit ("GPU") is employed, the edit operation will compete with other render operations for resources. On the other hand, if a central processing unit ("CPU") is employed, the edit operation will compete with resources needed for general purpose processing.

Thus, using either prior art per-pixel processing or prior art C-LUT generation techniques to modify an image in real-time is often impractical.

SUMMARY

The present description describes a method performed by a module executing on a computing device. The module receives a request to generate a new color lookup table. The request includes at least one parameter value indicating a parameter change input by a user. The request may indicate a number of data-points in the new color lookup table. The request may specify a size and a precision of the new color lookup table. The module generates a new color value for each of the data-points based on the at least one parameter value, appends the new color value for each of the data-points to a data structure, and generates the new color lookup table from the data structure. The new color lookup table is operable to replace a current color lookup table. The module may generate the new color value for each of at least a portion of the data-points in series, in parallel, or in a combination thereof.

The method may also include transmitting, by the module, the new color lookup table to an external process configured to generate at least one modified image by using the new color lookup table to replace colors of at least one digital image. The external process may display the at least one modified image on a display device. The external process may receive the parameter change input by the user, formulate the request, and send the request to the module.

The new color value may be stored as a Red Green Blue ("RGB") vector and the data structure may be a linear RGB matrix. Alternatively, the new color value may be stored as a Red Green Blue Alpha ("RGBA") vector and the data structure may be a linear RGBA matrix.

The new color lookup table is associated with a color space. The number of data-points in the new color lookup table may be fewer than a number of colors in the color space.

The number of data-points may be a second number of data-points, the current color lookup table may have a first number of data-points, and the first number of data-points may be different from the second number of data-points.

The parameter change input by the user may implement a pixel transform operation that includes at least one of a gamma curve remap, histogram equalization, a vibrance modification, a contrast modification, a temperature modification, a tint modification, a custom cinematic filter, and an RGB matrix operation.

The present description describes an image capture system that includes at least one processor, and memory storing instructions configured to be executed by the at least one processor. The instructions, when executed by the at least one processor, cause the at least one processor to perform a method that includes receiving a request to generate a new color lookup table. The request includes at least one parameter value indicating a parameter change input by a user. The request indicates a number of data-points in the new color lookup table. The request may specify a size and a precision of the new color lookup table. The method also includes generating a new color value for each of the data-points based on the at least one parameter value, appending the new color value generated for each of the data-points to a data structure, and generating the new color lookup table from the data structure. The new color lookup table is operable to replace a current color lookup table. The new color value may be generated for each of at least a portion of the data-points in series, in parallel, or in a combination thereof.

The image capture system may also include a camera configured to capture at least one digital image and store the at least one digital image in the memory, and a display device. In such embodiments, the method may include generating at least one modified image by using the new color lookup table to replace colors of the at least one digital image, and displaying the at least one modified image on the display device.

The instructions may be first instructions and the memory may store second instructions configured to be executed by the at least one processor. In such embodiments, the method may include transmitting the new color lookup table to the second instructions. The second instructions, when executed by the at least one processor, may cause the at least one processor to receive the parameter change input by the user, formulate the request, send the request to the first instructions, receive the new color lookup table from the first instructions, generate at least one modified image by using the new color lookup table to replace colors of at least one digital image, and display the at least one modified image on a display device.

The image capture system may be a mobile communication device.

The image capture system may store the new color value as a Red Green Blue ("RGB") vector and the data structure as a linear RGB matrix. Alternatively, the image capture system may store the new color value as a Red Green Blue Alpha ("RGBA") vector and the data structure as a linear RGBA matrix.

With respect to the image capture system, the parameter change input by the user may implement a pixel transform operation that includes at least one of a gamma curve remap, histogram equalization, a vibrance modification, a contrast modification, a temperature modification, a tint modification, a custom cinematic filter, and an RGB matrix operation.

With respect to the image capture system, the number of data-points may be a second number of data-points, the current color lookup table may have a first number of data-points, and the first number of data-points may be different from the second number of data-points.

The present description describes another method that includes receiving, by a module executing on a computing device, a series of requests to generate a series of new color lookup tables. Each of the series of new color lookup tables is a sparse color lookup table with respect to a current color lookup table. Each request in the series of requests corresponds to one of the series of new color lookup tables. Each request in the series of requests identifies at least one parameter change and a number of data-points in the corresponding new color lookup table. This method also includes generating, by the module, the series of new color lookup tables in response to the series of requests. Each successive one of the series of new color lookup tables replaces a previous one of the series of new color lookup tables. After the series of new color lookup tables is generated, this method includes receiving, by the module, a new request to generate a larger color lookup table. The new request indicates that the larger color lookup table is to have a number of data-points equal to a number of data-points present in the current color lookup table. This method also includes generating, by the module, the larger color lookup table in response to the new request. The larger color lookup table replaces at last one of the series of new color lookup tables.

This method may also include the module transmitting the series of new color lookup tables and the larger color lookup table to an external process. The external process may generate modified images using the series of new color lookup tables to replace colors in at least one digital image, display the modified images on a display device, generate at least one new modified image using the larger color lookup table to replace colors in the at least one digital image, and display the at least one new modified image on the display device. This method may also include the external process receiving a series of parameter changes input by a user, formulating the series of requests, sending the series of requests to the module, determining the user has stopped entering parameter changes, and sending the new request to the module after the external process determines the user has stopped entering parameter changes. In such embodiments, each request in the series of requests identifies at least one of the series of parameter changes.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
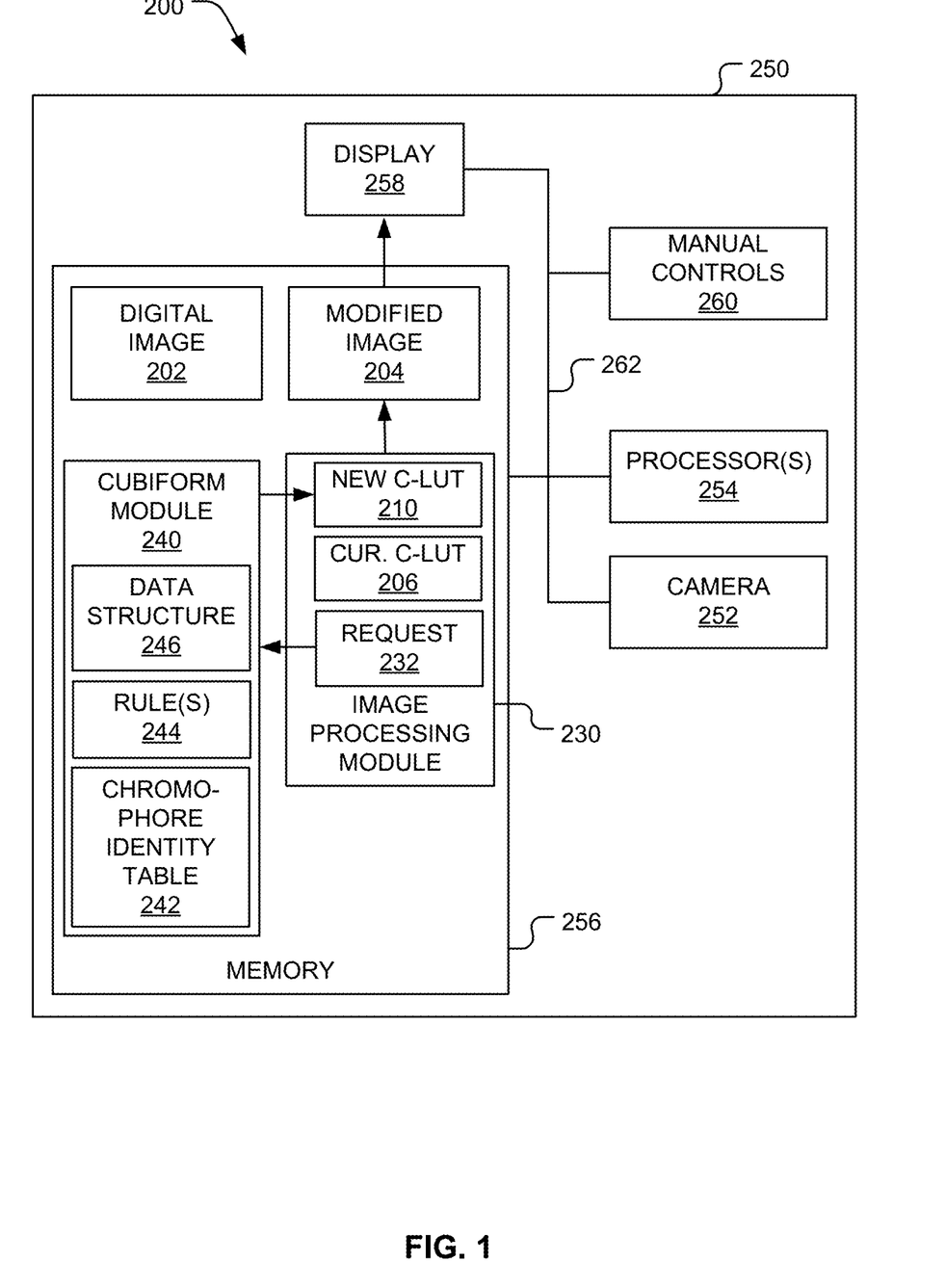
FIG. 1 is a functional block diagram of an image capture system.

FIG. 1 illustrates an image capture system 200 configured to capture and/or edit a digital image 202, a stream of images, and/or a video. For ease of illustration, the image capture system 200 will be described as modifying the digital image 202 to produce a modified image 204. However, embodiments in which the image capture system 200 modifies a stream of images or a video are within the scope of the present teachings.

The image capture system 200 modifies the digital image 202 after user inputs a change to one or more pixel transform parameters necessary to perform one or more pixel transform operations. By way of a non-limiting example, the pixel transform operation(s) may include one or more of the following:

1. a gamma curve remap,
2. histogram equalization,
3. a vibrance modification,
4. a contrast modification,
5. a temperature modification,
6. a tint modification,
7. an RGB matrix operation, and
8. a custom cinematic filter.

The pixel transform parameter(s) may include any parameter(s) necessary to implement the associated pixel transform operation.

Initially, the digital image 202 is displayed using a current C-LUT 206. The current C-LUT 206 may be in any color space (e.g., RGB, linRGB, LAB, LCh, and the like). After the user inputs a change to the pixel transform parameter(s) associated with one of the pixel transform operation(s), the image capture system 200 performs a Cubiform method 400 (see FIG. 3) that generates a new C-LUT 210 that replaces the current C-LUT 206. The new C-LUT 210 implements any changes to one or more of the pixel transform parameter(s), which may be characterized as curated being by the Cubiform method 400. The Cubiform method 400 neither edits the current C-LUT 206 nor modifies the digital image 202 directly. Instead, an image processing module 230 uses the new C-LUT 210 to remap the pixels of the digital image 202 and produce the modified image 204. In other words, the image processing module 230 determines new colors for each of the pixels of the digital image 202 by looking them up in the new C-LUT 210. For example, if the digital image 202 is in the Red Green Blue ("RGB") color space and one of its pixels has the color (255, 0, 0), which corresponds to red, the new C-LUT 210 may remap this color to a new color (0, 0, 255), which corresponds to blue. In other words, the image processing module 230 replaces the original color of each pixel in the digital image 202 with a new color specified by the new C-LUT 210. Thus, the new C-LUT 210 is used to modify the global color map of the digital image 202. In other words, the Cubiform method 400 does not apply spatial filters or adjustments to isolated sectors of the digital image 202. Every pixel in the digital image 202 is remapped using the same new C-LUT 210.

While the Cubiform method 400 (see FIG. 3) will be described as creating the new C-LUT 210, the Cubiform method 400 may generate a stream of C-LUTs, which is a series of C-LUTs made available one at a time in succession as the pixel transform parameter(s) associated with at least one of the pixel transform operation(s) are modified by a user in real-time. Each new C-LUT in the stream replaces (e.g., overwrites) a previous C-LUT in the stream. For example, the user may move a slider (e.g., reducing an amount of the contrast in an image), which will send one or more rapidly changing pixel transform parameter values to the Cubiform method 400. The stream of C-LUTs created by the Cubiform method 400 may be used by the image processing module 230 to remap the digital image 202 (or the series of images) for a fixed computational cost. In other words, the Cubiform method 400 provides a mechanism that rapidly generates a stream of C-LUTs for efficient image remapping. Thus, the Cubiform method 400 avoids a variable compute time that is typical of conventional per-pixel mathematical processes and increases as complexity of the changes increases.

In this description, the phrase "real time" refers events occurring during a video editing or capturing process. In the context of live video image processing, "real-time" performance is achieved when the user is able to do all of the required work in the inter-frame temporal window. For example, if a user is recording video at 60 FPS, the amount of time that the software has to do the work is 16.7 milliseconds (the approximate time between frames). If the C-LUT generation and/or image-processing takes more than 16.7 milliseconds, it is not a real-time solution. If, on the other hand, the work can be done under 16.7 milliseconds (e.g., within 8 ms), "real-time" performance has been achieved.

Like the current C-LUT 206, the new C-LUT 210 may be in any color space (e.g., RGB, linRGB, LAB, LCh, and the like). The new C-LUT 210 may be conceptualized as being a multi-dimensional matrix of color values. For example, if the digital image 202 is in the RGB color space, the new C-LUT 210 may have three dimensions, one for each color channel. Similarly, if the digital image 202 is in the Red Green Blue Alpha ("RGBA") color space, the new C-LUT 210 may have four dimensions, one for each color channel and one for an alpha value. However, no matter how many different color dimensions the new C-LUT 210 includes, the new C-LUT 210 may be stored in a data structure having fewer dimensions. For example, the new C-LUT 210 may be linearized and transmitted as a data stream to the image processing module 230.

A full-sized C-LUT includes a color value for each unique color value in the color space. For example, a typical full-sized RGB C-LUT stores $256^3$ unique color values that are addressed by 24 bit addresses (8 bits for each color channel). A sparse C-LUT includes a color value for fewer than all of the color values in the color space and may be used instead of a full-sized C-LUT to produce a modified image (e.g., with a lower color resolution). The image processing module 230 may interpolate between two or more of the color values in the sparse C-LUT to determine a new color for a pixel in the modified image 204.

Conventional methods of generating a C-LUT generate a full sized C-LUT whenever a pixel transform parameter is changed. In contrast, the Cubiform method 400 may be used to create C-LUTs having different sizes and/or different precisions. For example, one or more of the C-LUTs within a stream may include a color value for fewer than all of the color values in the color space. By way of a non-limiting example, if the color space includes 256×256×256 colors, the new C-LUT 210 may include only 64×64×64 colors. Thus, when the pixel transform parameter values are changing rapidly, the Cubiform method 400 may generate a series of sparse C-LUTs that each include fewer color values than the color space. On the other hand, when the pixel transform parameter values are changing slowly or have stopped changing, the Cubiform method 400 may generate a larger or full sized C-LUT. A sparse C-LUT allows the image processing module 230 to remap the digital image 202 to create the modified image 204 and display the modified image 204 to the user so the user can get an impression of what the edited image will look like when the a full sized C-LUT is used to remap the digital image 202.

Because the new C-LUT 210 may be a sparse C-LUT and the current C-LUT 206 may or may not be a sparse C-LUT, the current C-LUT 206 and the new C-LUT 210 may include different numbers of data-points. For example, if the current C-LUT 206 is full sized, the new C-LUT 210 may be sparse. Then, the sparse new C-LUT 210 may replace the current C-LUT 206. At a later time, the new C-LUT 210 may be full size and the current C-LUT 206 may be sparse. Then, the full size new C-LUT 210 may replace the sparse current C-LUT 206. Thus, the current C-LUT 206 and the new C-LUT 210 may be different sizes and/or include a different numbers of data-points.

An advantage of using the preprocessed or pre-calculated values of the new C-LUT 210 to remap the digital image 202 becomes apparent at render time. The image processing module 230 requires only a simple kernel to ingest the new C-LUT 210 and remap the digital image 202. Render times are both low and fixed, not increasing with the complexity of the image remap procedure. Therefore, the Cubiform method 400 may be an efficient method of modifying the global color information of the digital image 202 or a stream of images.

By way of a non-limiting example, the image capture system 200 may be implemented as a mobile communication device 140 (described below and illustrated in FIG. 4). The image capture system 200 includes a housing 250, a camera 252, one or more processors 254, memory 256, a display device 258, and one or more manual controls 260. The camera 252, the processor(s) 254, the memory 256, and the display device 258 may be connected together by a bus 262 (e.g., like a bus system 186 illustrated in FIG. 4).

The camera 252 is mounted on the housing 250. The camera 252 is configured to capture the digital image 202 and store that digital image 202 in the memory 256. By way of a non-limiting example, the camera 252 may be implemented as a camera or video capture device 158 (see FIG. 4).

The processor(s) 254 is/are configured to execute software instructions stored in the memory 256. By way of a non-limiting example, the processor(s) 254 may be implemented as a central processing unit ("CPU") 150 (see FIG. 4) and the memory 256 may be implemented as memory 152 (see FIG. 4).

The display device 258 is positioned to be viewed by the user while the user operates the image capture system 200. The display device 258 is configured to display the digital image 202 being captured by the camera 252 and the modified image 204. By way of a non-limiting example, the display device 258 may be implemented as conventional display device, such as a touch screen. The display device 258 may be mounted on the housing 250. For example, the display device 258 may be implemented as a display 154 (see FIG. 4). Alternatively, the display device 258 may be implemented as an electronic viewfinder, an auxiliary monitor connected to the image capture system 200, and the like.

The manual control(s) 260 is/are configured to be operated by the user and used thereby to input a change to one or more of the pixel transform parameter(s) associated with one of the pixel transform operation(s). The manual control(s) 260 may be implemented as software controls that generate virtual controls displayed by the display device 258. In such embodiments, the display device 258 may be implemented as touch screen configured to receive user input that manually manipulates the manual control(s) 260. Alternatively, the manual control(s) 260 may be implemented as physical controls (e.g., button, knobs, and the like) disposed on the housing 250 and configured to be manually manipulated by the user. In such embodiments, the manual control(s) 260 may be connected to the processor(s) 254 and the memory 256 by the bus 262.

The memory 256 stores the image processing module 230 and a Cubiform module 240 implemented by the processor(s) 254. The image processing module 230 may be characterized as being an external process with respect to the Cubiform module 240. In some embodiments, the image processing module 230 may generate and display the virtual controls implementing the manual control(s) 260. Alternatively, the manual control(s) 260 may be implemented by other software instructions stored in the memory 256. The Cubiform module 240 stores instructions executable by the processor(s) 254 that implement the Cubiform method 400 illustrated in FIG. 3. The Cubiform module 240 may include a chromophore identity table 242 and one or more rules 244 for creating the new C-LUT 210. The chromophore identity table 242 stores supporting lookup tables that may be used as identity look up tables or as a means to accelerate color-model or color space transformations during the generation of the new C-LUT 210. In other words, the chromophore identity table 242 stores pre-calculated values that help reduce computational time. For example, the chromophore identity table 242 may include color space transforms. Some types of changes to the pixel transform parameter(s) are implemented better and/or more easily in a particular color space. For example, it may be desirable to implement a particular change to one or more of the pixel transform parameter(s) (e.g., indicating red is to be desaturated) in the Light Chroma hue angle ("LCh") color space. The Cubiform method 400 may first use the chromophore identity table 242 to convert an original RGB C-LUT to an LCh color space. Then, the Cubiform method 400 may implement the change to the pixel transform parameter(s) (e.g., using the rules 244). Next, the Cubiform method 400 may use the chromophore identity table 242 to convert the LCh C-LUT back to an RGB C-LUT.

Figure 2:
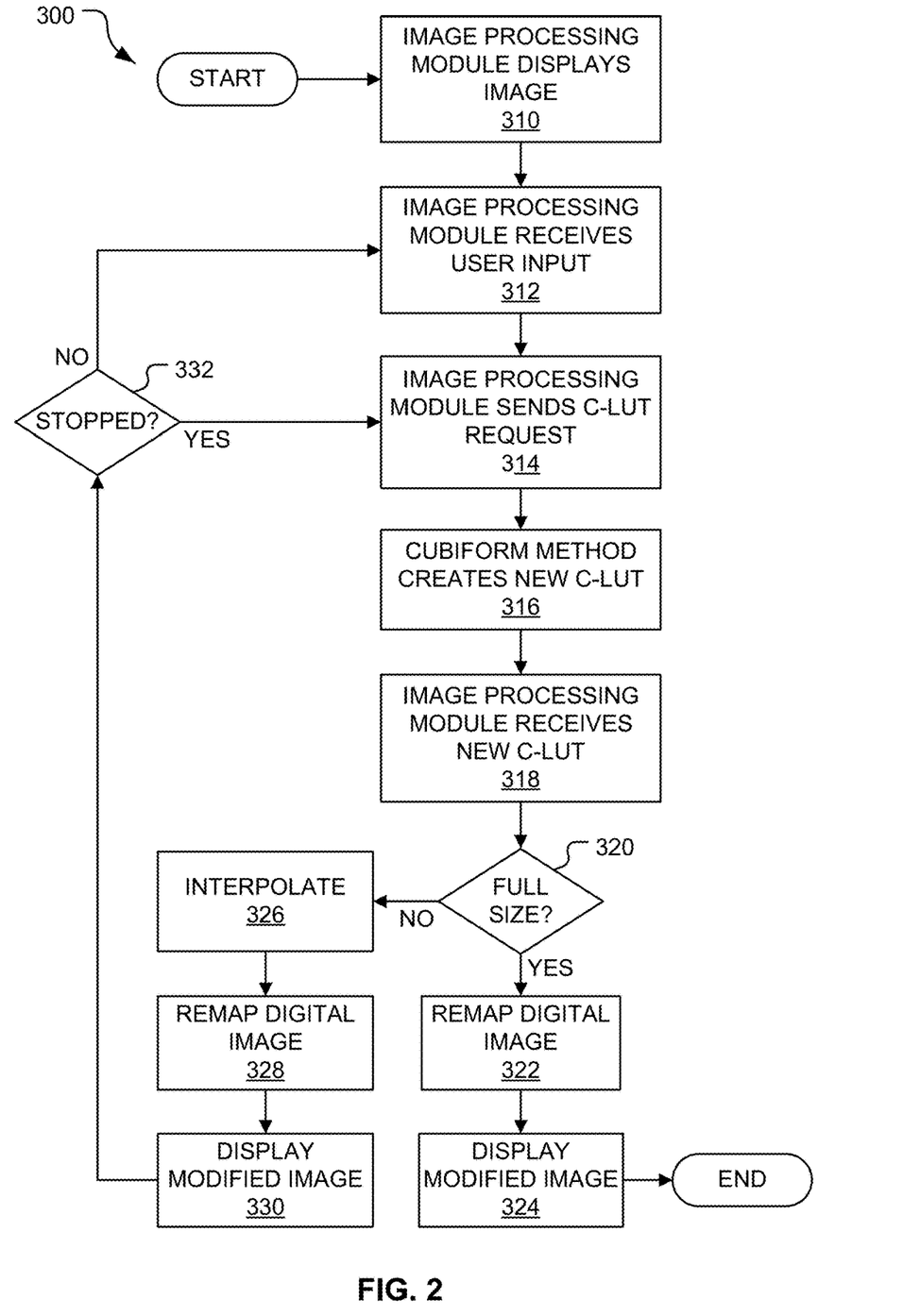
FIG. 2 is a flow diagram of a method of producing a modified image performable by the image capture system.

FIG. 2 is a flow diagram of a method 300 that may be used by the image capture system 200 (see FIG. 1) to produce the modified image 204 (see FIG. 1). In first block 310, referring to FIG. 1, the image processing module 230 displays the digital image 202 on the display device 258. Depending on the implementation details, the image processing module 230 may also display the manual control(s) 260 on the display device 258.

In block 312 (see FIG. 2), the image processing module 230 receives user input from the manual control(s) 260. The user input includes a change to at least one of the pixel transform parameter(s).

Then, in block 314 (see FIG. 2), the image processing module 230 formulates a C-LUT request 232 and sends it to the Cubiform module 240. Thus, the C-LUT request 232 is sent when a user changes at least one of the pixel transform parameter(s). The C-LUT request 232 includes the change made by the user input. The C-LUT request 232 may specify the size and/or precision of the new C-LUT 210. In other words, the C-LUT request 232 may specify whether the new C-LUT 210 will be full sized or sparse. The number of pre-calculated values or data-points of the new C-LUT 210 may be determined from the size and/or precision specified by the C-LUT request 232. The size may refer to a C-LUT dimension (e.g., a number of data-points per color component or color channel) and the precision may refer to a number of bits per color (e.g., 16 bits, 32 bits, 64 bits, and the like). The C-LUT request 232 may optionally identify the current C-LUT 206 that will be replaced (e.g., overwritten) by the new C-LUT 210.

In response to the C-LUT request 232, in block 316 (see FIG. 2), the Cubiform module 240 performs the Cubiform method 400 (see FIG. 3), which creates the new C-LUT 210 and sends it to the image processing module 230.

In block 318 (see FIG. 2), the image processing module 230 receives the new C-LUT 210. The new C-LUT 210 replaces the current C-LUT 206. In other words, the current C-LUT 206 is immediately discarded by the image processing module 230.

In decision block 320 (see FIG. 2), the image processing module 230 determines whether the new C-LUT 210 is full size. The decision in decision block 320 (see FIG. 2) is "YES," when the new C-LUT 210 is full size. Otherwise, the decision in decision block 320 (see FIG. 2) is "NO."

When the decision in decision block 320 (see FIG. 2) is "YES," in block 322 (see FIG. 2), the image processing module 230 creates the modified image 204 by remapping the digital image 202 using the new C-LUT 210. Then, in block 324 (see FIG. 2), the image processing module 230 displays the modified image 204 on the display device 258. Then, the method 300 terminates.

When the decision in decision block 320 (see FIG. 2) is "NO," in block 326 (see FIG. 2), the image processing module 230 interpolates any required values from the new C-LUT 210. Then, in block 328 (see FIG. 2), the image processing module 230 creates the modified image 204 by remapping the digital image 202 using the new C-LUT 210 and the interpolated values. Then, in block 330 (see FIG. 2), the image processing module 230 displays the modified image 204 on the display device 258.

Next, in decision block 332 (see FIG. 2), the image processing module 230 determines whether the user has stopped editing the pixel transform parameter(s). The decision in decision block 332 (see FIG. 2) is "YES," when the image processing module 230 has determined that the user has stopped editing the pixel transform parameter(s). Otherwise, the decision in decision block 332 (see FIG. 2) is "NO."

When the decision in decision block 332 (see FIG. 2) is "YES," the image processing module 230 returns to block 314 (see FIG. 2) where the image processing module 230 formulates a new C-LUT request (like the C-LUT request 232) and sends it to the Cubiform module 240. This new C-LUT request specifies that the new C-LUT 210 is to be full size (e.g., includes the size and/or precision of a full size C-LUT).

When the decision in decision block 332 (see FIG. 2) is "YES," the image processing module 230 returns to block 312 (see FIG. 2) and receives new user input from the manual control(s) 260.

To implement a rapid series of changes to the pixel transform parameter(s), in block 316 (see FIG. 2), the Cubiform method 400 is used to generate and deliver new C-LUTs with a similar corresponding rapidity. To accomplish this, the Cubiform method 400 generates C-LUTs at variable precisions based on instructions received from the image processing module 230 (e.g., the size and precision specified in the C-LUT request 232). When one or more of the pixel transform parameter(s) are changing rapidly, the image processing module 230 instructs the Cubiform method 400 to generate a smaller C-LUT (one that requires more data-point interpolation at run-time). When the user has finished entering changes, the image processing module 230 instructs the Cubiform method 400 to generate a much larger C-LUT (one that does not require as much data-point interpolation). For example, the image processing module 230 may instructs the Cubiform method 400 to generate a full sized C-LUT when the user has stopped entering changes. Thus, while the user is entering changes, the Cubiform method 400 may reflect those changes in real-time at the cost of a lower resultant image quality. When the user has stopped entering changes, the Cubiform method 400 may generate a high-precision C-LUT capable of producing a high-quality image remap.

Figure 3:
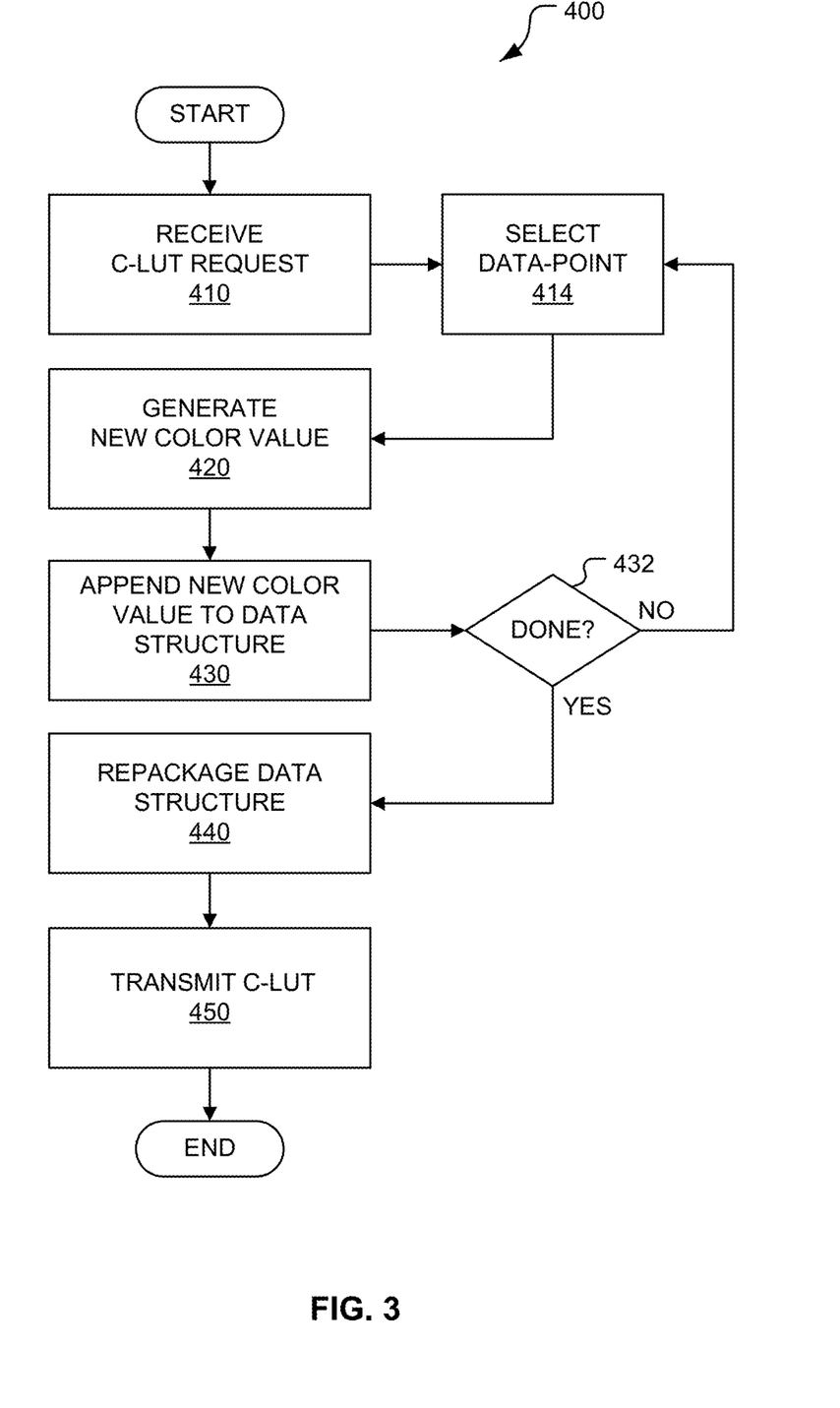
FIG. 3 is a flow diagram of a Cubiform method of generating a new C-LUT performable by the image capture system.

FIG. 3 is a flow diagram of the Cubiform method 400 performed by the processor(s) 254 (see FIG. 1) when executing the instructions stored in the Cubiform module 240 (see FIG. 1). In first block 410, the Cubiform method 400 receives the C-LUT request 232 (see FIG. 1) from the image processing module 230 (see FIG. 1). Referring to FIG. 1, as mentioned above, the C-LUT request 232 includes the change made to at least one of the pixel transform parameter(s) by the user input. The C-LUT request 232 may specify the size and/or precision of the new C-LUT 210.

In next block 414, the Cubiform method 400 selects a data-point in the new C-LUT 210. As mentioned above, the number data-points of the new C-LUT 210 may be determined from the size and/or precision specified by the C-LUT request 232.

Then, referring to FIG. 3, in block 420, the Cubiform method 400 generates a new color value for the selected data-point based on the change made to at least one of the pixel transform parameter(s) by the user input. In other words, the new color value is generated to comply with the change(s) made to the pixel transform parameter(s). For example, if the pixel transform operation is desaturation, the following formula may be used: brightness=distance(vector, double3(0.0))/1.7320508075688772. The function "distance" returns a distance (expressed within a range of zero to one) between an initial color (represented by a variable "vector") and black (represented by double3(0.0)). The initial color may be a corresponding color value in the unmodified color space, a color value obtained from the chromophore identity table 242 (see FIG. 1), or a calculated color value (e.g., calculated using the rule(s) 244 illustrated in FIG. 1). The new color value may be set equal to the result "brightness" loaded into all of the color channels (e.g., into all three vector RGB elements) using the following formula: double3 monochrome=double3(brightness, brightness, brightness). Thus, when the new C-LUT 210 is applied to the digital image 202, the modified image 204 created is a monochrome representation of the digital image 202. Alternate methods of generating new color values and performing pixel transform operations are well known in the art and will not be described in detail. Since the new color values are pre-calculated and loaded into the new C-LUT 210, at run-time, this math does not need to be reapplied to each pixel. Instead, the new color values are simply "looked up" in the new C-LUT 210. The new color values may each be expressed as a vector (e.g., a RGBA vector, a RGB vector, and the like). The Cubiform method 400 may use the rule(s) 244 (see FIG. 1) and the chromophore identity table 242 (see FIG. 1) to generate the new color value.

Next in block 430, the Cubiform method 400 appends the new color value to a data structure 246 (see FIG. 1). The new C-LUT 210 (see FIG. 1) is created from the data structure 246. Thus, the new color value becomes a new data-point in the new C-LUT 210. The data structure 246 may be implemented as a linear color cube. By way of a non-limiting example, in block 430, the data structure 246 may be implemented as a symmetrical, volumetric linear RGBA cube. While the new C-LUT 210 may have an RGB format, the new C-LUT 210 may have other formats and the present disclosure is not limited to only RGB format.

In decision block 432, the Cubiform method 400 determines whether a new color value has been generated for all of the data-points within the new C-LUT 210. The decision in decision block 432 is "YES," when new color values have been generated for all of the data-points within the new C-LUT 210. Otherwise, the decision in decision block 432 is "NO."

When the decision in decision block 432 is "NO," the Cubiform method 400 returns to block 414 and selects another data-points within the new C-LUT 210. While blocks 414-432 have been described as being performed in series, in alternate embodiments, the functions of these blocks may be performed in parallel and such embodiments are within the scope of the present teachings.

When the decision in decision block 432 is "YES," in block 440, the Cubiform method 400 repackages the data structure 246 (see FIG. 1) into the new C-LUT 210 for use by the image processing module 230 (see FIG. 1). In other words, the data structure 246 is repackaged into an ingestible and appropriate format for the image processing module 230. By way of a non-limiting example, the data structure 246 may be packaged as a string of 32-bit or 64-bit floating point variables in a contiguous data object (e.g., configured to be supplied to a filter or shader of the image processing module 230 illustrated in FIG. 1).

In block 450, the Cubiform method 400 transmits the new C-LUT 210 (see FIG. 1) to the image processing module 230 (see FIG. 1).

Then, the Cubiform method 400 terminates.

Blocks 414-430 may be performed differently based on the platform because different computing environments have different tools, resources, and performance characteristics. For example, a single instruction, multiple data ("SIMD") process may be used to perform a portion of the Cubiform method 400. In such an embodiment, blocks 414-430 may be performed in series as illustrated in FIG. 3. The SIMD process may be used to define how each of the new color values is calculated in block 420. To alleviate GPU utilization on platforms where a suite of CPU-bound SIMD functions are available and well-optimized, the Cubiform method 400 may generate the new C-LUT 210 by extruding a series of 64-bit three-element floating-point vectors (double3) and processing each data-point of the new C-LUT 210 as a 0-1 scalar using SIMD vector-unit functions. For example, the series of vectors may be extruded using a software function that (1) allocates a 'block' of random access memory, (2) fills the 'block' of random access memory with a string (or series) of vectors representing unmodified RGB color values from the unmodified RGB color space, and (3) sends each unmodified RGB color value to another function that modifies the unmodified RGB color value to create the new color value according to the change(s) made to the pixel transform parameter(s). Every new color value is generated (in block 420) and appended to the data structure 246 (in block 430) in series. Before the new color value is appended to the data structure 246, each color channel of the new color value may be converted from a floating-point representation (e.g., within a range of zero to one) to a consumable integer, e.g., within a range of 0-255 (for 8-bit color), within a range of 0-1,023 (for 10-bit color), etc. While the SIMD process may be only moderately performant, it benefits from 64-bit per-element (or data-point) precision.

By way of another non-limiting example, a Parallel Image Processing Kernel ("PIPK") may be used to perform a portion of the Cubiform method 400. In such an embodiment, the functions of blocks 414-430 may be performed for two or more of the data-points of the new C-LUT 210 in parallel. The PIPK method may be used to choose the pixel transform parameter(s) used to calculate the new C-LUT 210 depending on the user's actions. On platforms where CPU-bound or GPU-bound parallel image-processing kernels may be employed, the new C-LUT 210 may be generated therewith. In such embodiments, the chromophore identity table 242 may include a linear RGB identity table that is used to generate the new C-LUT 210. This implementation may employ the highest possible per-element floating-point precision permitted by a particular kernel runtime. During a stream of user-initiated parameter modifications, the PIPK method generates a series of low resolution C-LUTs that reflect the user's changes in real time. However, unlike the SIMD method, the PIPK method is more likely to be GPU-accelerated and has the ability to generate the new color values (e.g., as RGB vectors) in parallel rather than in series. After edits have concluded (e.g., the decision in decision block 332 is "YES" in FIG. 2), the PIPK method generates a larger C-LUT (e.g., a full sized C-LUT). Simply put, as parameters are changing, an image processing kernel is used to generate a stream of lower quality C-LUTs. When parameters stop changing, the same method is employed to generate a single high-quality C-LUT.

Mobile Communication Device

Figure 4:
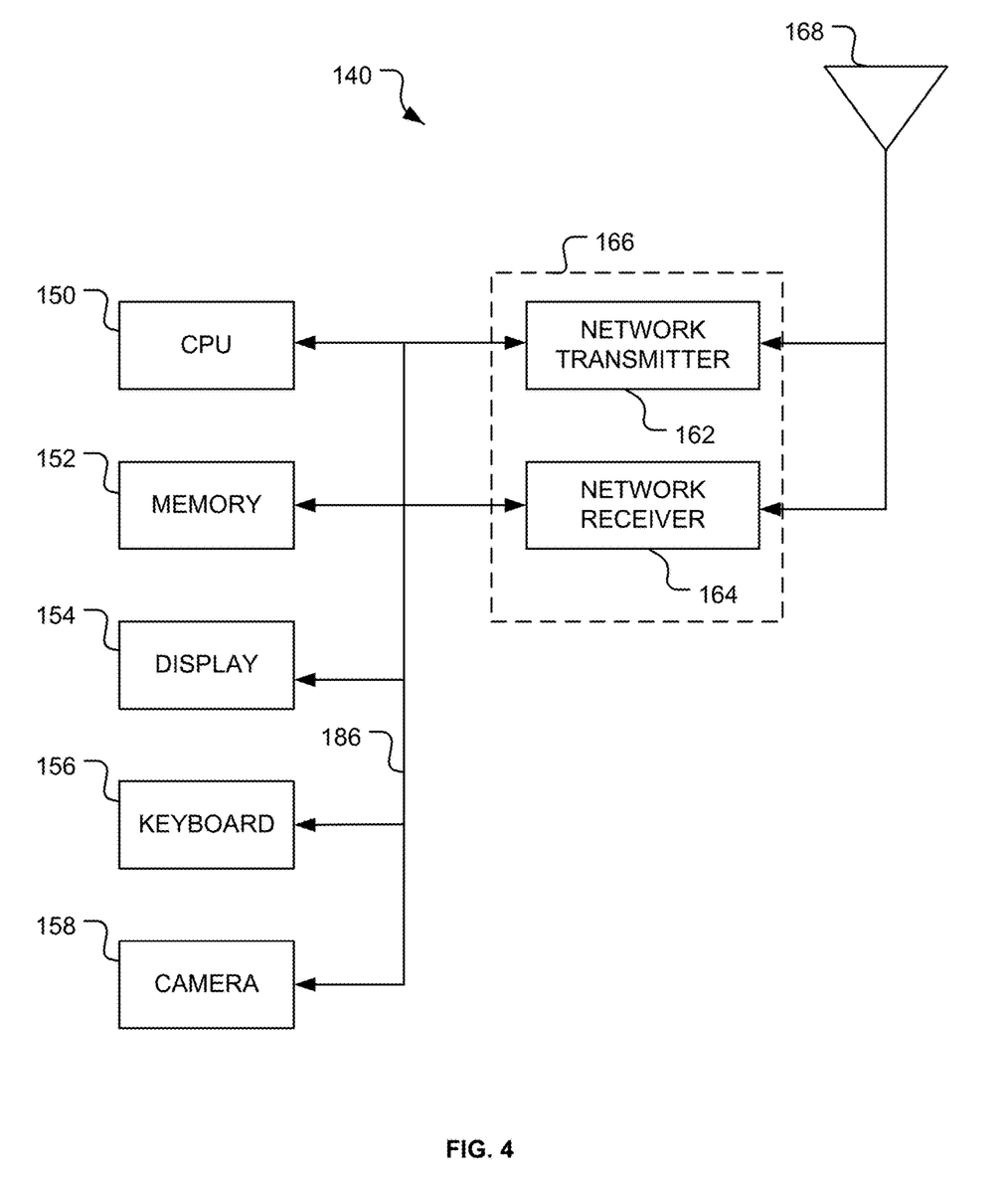
FIG. 4 is a functional block diagram illustrating an exemplary mobile communication device that may be used to implement the image capture system.

FIG. 4 is a functional block diagram illustrating the mobile communication device 140. The image capture system 200 may be implemented by the mobile communication device 140. The mobile communication device 140 may be implemented as a cellular telephone, smartphone, a tablet computing device, and the like. By way of a non-limiting example, the mobile communication device 140 may be implemented as a smartphone executing IOS or Android OS.

The mobile communication device 140 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The mobile communication device 140 is not limited by the specific form of the CPU 150.

The mobile communication device 140 also contains a memory 152. The memory 152 may store instructions and data to control operation of the CPU 150. The memory 152 may include random access memory, ready-only memory, programmable memory, flash memory, and the like. The mobile communication device 140 is not limited by any specific form of hardware used to implement the memory 152. The memory 152 may also be integrally formed in whole or in part with the CPU 150.

The mobile communication device 140 also includes conventional components, such as a display 154, a camera or video capture device 158, and keypad or keyboard 156. These are conventional components that operate in a known manner and need not be described in greater detail. Other conventional components found in wireless communication devices, such as USB interface, Bluetooth interface, infrared device, and the like, may also be included in the mobile communication device 140. For the sake of clarity, these conventional elements are not illustrated in the functional block diagram of FIG. 4.

The mobile communication device 140 also includes a network transmitter 162 such as may be used by the mobile communication device 140 for normal network wireless communication with a base station (not shown). FIG. 4 also illustrates a network receiver 164 that operates in conjunction with the network transmitter 162 to communicate with the base station (not shown). In a typical embodiment, the network transmitter 162 and network receiver 164 are implemented as a network transceiver 166. The network transceiver 166 is connected to an antenna 168. Operation of the network transceiver 166 and the antenna 168 for communication with a wireless network (not shown) is well-known in the art and need not be described in greater detail herein.

The mobile communication device 140 may also include a conventional geolocation module (not shown) operable to determine the current location of the mobile communication device 140.

The various components illustrated in FIG. 4 are coupled together by a bus system 186. The bus system 186 may include an address bus, data bus, power bus, control bus, and the like. For the sake of convenience, the various busses in FIG. 4 are illustrated as the bus system 186.

The memory 152 may store instructions executable by the CPU 150. The instructions may implement portions of one or more of the methods described above, including the methods 300 and 400 illustrated in FIGS. 2 and 3, respectively. Such instructions may be stored on one or more non-transitory computer or processor readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A method comprising:
receiving, by a module executing on a computing device, a request to generate a new color lookup table, the request including at least one parameter value indicating a parameter change input by a user, the request indicating a number of data-points in the new color lookup table, the parameter change input by the user implementing a pixel transform operation comprising at least one of a gamma curve remap, histogram equalization, a vibrance modification, a contrast modification, a temperature modification, a tint modification, a custom cinematic filter, and an RGB matrix operation;
generating, by the module, a new color value for each of the data-points based on the at least one parameter value, the new color value being stored as a Red Green Blue ("RGB") vector;
appending, by the module, the new color value for each of the data-points to a data structure, the data structure being a linear RGB matrix; and
generating, by the module, the new color lookup table from the data structure, the new color lookup table being operable to replace a current color lookup table.

2. The method of claim 1, further comprising:
transmitting, by the module, the new color lookup table to an external process configured to generate at least one modified image by using the new color lookup table to replace colors of at least one digital image.

3. The method of claim 2, further comprising:
displaying, by the external process, the at least one modified image on a display device.

4. The method of claim 2, further comprising:
receiving, by the external process, the parameter change input by the user;
formulating, by the external process, the request; and
sending, by the external process, the request to the module.

5. The method of claim 1, wherein the new color lookup table is associated with a RGB color space; and
the number of data-points in the new color lookup table is fewer than a number of colors in the RGB color space.

6. The method of claim 1, wherein the request specifies a size and a precision of the new color lookup table.

7. The method of claim 1, wherein the number of data-points is a second number of data-points,
the current color lookup table has a first number of data-points, and
the first number of data-points is different from the second number of data-points.

8. The method of claim 1, wherein the module generates the new color value for each of at least a portion of the data-points in parallel.

9. An image capture system comprising:
at least one processor; and
memory storing first and second instructions configured to be executed by the at least one processor, the first instructions, when executed by the at least one processor, causing the at least one processor to perform a method comprising:
receiving a request to generate a new color lookup table, the request including at least one parameter value indicating a parameter change input by a user, the request indicating a number of data-points in the new color lookup table;
generating a new color value for each of the data-points based on the at least one parameter value;
appending the new color value generated for each of the data-points to a data structure;
generating the new color lookup table from the data structure, the new color lookup table being operable to replace a current color lookup table; and
transmitting the new color lookup table to a process implemented by the second instructions, the second instructions, when executed by the at least one processor, causing the at least one processor to implement the process which is configured to:
receive the parameter change input by the user,
formulate the request, send the request that is received by the at least one processor when performing the method, receive the new color lookup table that is transmitted by the at least one processor when performing the method, generate at least one modified image by using the new color lookup table to replace colors of at least one digital image, and display the at least one modified image on a display device.

10. The image capture system of claim 9, further comprising:

a camera configured to capture the at least one digital image and store the at least one digital image in the memory; and the display device configured to display the at least one modified image.

11. The image capture system of claim 9, wherein the image capture system is a mobile communication device.

12. The image capture system of claim 9, wherein the new color value is stored as a Red Green Blue ("RGB") vector and the data structure is a linear RGB matrix.

13. The image capture system of claim 9, wherein the new color value is stored as a Red Green Blue Alpha ("RGBA") vector and the data structure is a linear RGBA matrix.

14. The image capture system of claim 9, wherein the parameter change input by the user implements a pixel transform operation comprising at least one of a gamma curve remap, histogram equalization, a vibrance modification, a contrast modification, a temperature modification, a tint modification, a custom cinematic filter, and an RGB matrix operation.

15. The image capture system of claim 9, wherein the request specifies a size and a precision of the new color lookup table.

16. The image capture system of claim 9, wherein the number of data-points is a second number of data-points, the current color lookup table has a first number of data-points, and the first number of data-points is different from the second number of data-points.

17. The image capture system of claim 9, wherein the new color value is generated for each of at least a portion of the data-points in parallel.

18. A method comprising:

receiving, by a module executing on a computing device, a series of requests to generate a series of new color lookup tables, each of the series of new color lookup tables being a sparse color lookup table with respect to a current color lookup table, each request in the series of requests corresponding to one of the series of new color lookup tables, each request in the series of requests identifying at least one parameter change and a number of data-points in the corresponding new color lookup table;

generating, by the module, the series of new color lookup tables in response to the series of requests, each successive one of the series of new color lookup tables replacing a previous one of the series of new color lookup tables;

after generating the series of new color lookup tables, receiving, by the module, a new request to generate a larger color lookup table, the new request indicating that the larger color lookup table is to have a number of data-points equal to a number of data-points present in the current color lookup table; and generating, by the module, the larger color lookup table in response to the new request, the larger color lookup table replacing a last one of the series of new color lookup tables.

19. The method of claim 18, further comprising:

transmitting, by the module, the series of new color lookup tables to an external process;

generating, by the external process, modified images using the series of new color lookup tables to replace colors in at least one digital image;

displaying, by the external process, the modified images on a display device;

transmitting, by the module, the larger color lookup table to the external process;

generating, by the external process, at least one new modified image using the larger color lookup table to replace colors in the at least one digital image; and displaying, by the external process, the at least one new modified image on the display device.

20. The method of claim 19, further comprising:

receiving, by the external process, a series of parameter changes input by a user;

formulating, by the external process, the series of requests, each request in the series of requests identifying at least one of the series of parameter changes;

sending, by the external process, the series of requests to the module;

determining, by the external process, the user has stopped entering parameter changes; and sending, by the external process, the new request to the module after the external process determines the user has stopped entering parameter changes.

21. A method comprising:

receiving, by a module executing on a computing device, a request to generate a new color lookup table, the request including at least one parameter value indicating a parameter change input by a user, the request indicating a number of data-points in the new color lookup table;

generating, by the module, a new color value for each of the data-points based on the at least one parameter value, the new color value being stored as a Red Green Blue Alpha ("RGBA") vector;

appending, by the module, the new color value for each of the data-points to a data structure, the data structure being a linear RGBA matrix; and generating, by the module, the new color lookup table from the data structure, the new color lookup table being operable to replace a current color lookup table.

22. The method of claim 21, further comprising:

transmitting, by the module, the new color lookup table to an external process configured to generate at least one modified image by using the new color lookup table to replace colors of at least one digital image.

23. The method of claim 22, further comprising:

displaying, by the external process, the at least one modified image on a display device.

24. The method of claim 22, further comprising:

receiving, by the external process, the parameter change input by the user;

formulating, by the external process, the request; and sending, by the external process, the request to the module.

25. The method of claim 21, wherein the new color lookup table is associated with a RGBA color space; and the number of data-points in the new color lookup table is fewer than a number of colors in the RGBA color space.

26. The method of claim 21, wherein the parameter change input by the user implements a pixel transform operation comprising at least one of a gamma curve remap, histogram equalization, a vibrance modification, a contrast modification, a temperature modification, a tint modification, a custom cinematic filter, and an RGB matrix operation.

27. The method of claim 21, wherein the request specifies a size and a precision of the new color lookup table.

28. The method of claim 21, wherein the number of data-points is a second number of data-points,
the current color lookup table has a first number of data-points, and
the first number of data-points is different from the second number of data-points.

29. The method of claim 21, wherein the module generates the new color value for each of at least a portion of the data-points in parallel.

30. A method comprising:
receiving, by a module executing on a computing device, a request to generate a new color lookup table, the request including at least one parameter value indicating a parameter change input by a user, the request indicating a number of data-points in the new color lookup table, the new color lookup table being associated with a color space, the number of data-points in the new color lookup table being fewer than a number of colors in the color space;
generating, by the module, a new color value for each of the data-points based on the at least one parameter value, the new color value being stored as a Red Green Blue Alpha ("RGBA") vector;
appending, by the module, the new color value for each of the data-points to a data structure, the data structure being a linear RGBA matrix; and
generating, by the module, the new color lookup table from the data structure, the new color lookup table being operable to replace a current color lookup table.

31. The method of claim 30, further comprising:
transmitting, by the module, the new color lookup table to an external process configured to generate at least one modified image by using the new color lookup table to replace colors of at least one digital image.

32. The method of claim 31, further comprising:
displaying, by the external process, the at least one modified image on a display device.

33. The method of claim 31, further comprising:
receiving, by the external process, the parameter change input by the user;
formulating, by the external process, the request; and
sending, by the external process, the request to the module.

34. The method of claim 30, wherein the parameter change input by the user implements a pixel transform operation comprising at least one of a gamma curve remap, histogram equalization, a vibrance modification, a contrast modification, a temperature modification, a tint modification, a custom cinematic filter, and an RGB matrix operation.

35. The method of claim 30, wherein the request specifies a size and a precision of the new color lookup table.

36. The method of claim 30, wherein the number of data-points is a second number of data-points,
the current color lookup table has a first number of data-points, and
the first number of data-points is different from the second number of data-points.

37. The method of claim 30, wherein the module generates the new color value for each of at least a portion of the data-points in parallel.

38. A method comprising:
receiving, by a module executing on a computing device, a request to generate a new color lookup table, the request including at least one parameter value indicating a parameter change input by a user, the request indicating a number of data-points in the new color lookup table, the parameter change input by the user implementing a pixel transform operation comprising at least one of a gamma curve remap, histogram equalization, a vibrance modification, a contrast modification, a temperature modification, a tint modification, a custom cinematic filter, and a Red Green Blue ("RGB") matrix operation;
generating, by the module, a new color value for each of the data-points based on the at least one parameter value;
appending, by the module, the new color value for each of the data-points to a data structure; and
generating, by the module, the new color lookup table from the data structure, the new color lookup table being operable to replace a current color lookup table.

39. The method of claim 38, further comprising:
transmitting, by the module, the new color lookup table to an external process configured to generate at least one modified image by using the new color lookup table to replace colors of at least one digital image.

40. The method of claim 39, further comprising:
displaying, by the external process, the at least one modified image on a display device.

41. The method of claim 39, further comprising:
receiving, by the external process, the parameter change input by the user;
formulating, by the external process, the request; and
sending, by the external process, the request to the module.

42. The method of claim 38, wherein the request specifies a size and a precision of the new color lookup table.

43. The method of claim 38, wherein the number of data-points is a second number of data-points,
the current color lookup table has a first number of data-points, and
the first number of data-points is different from the second number of data-points.

44. The method of claim 38, wherein the module generates the new color value for each of at least a portion of the data-points in parallel.

45. A mobile communication device comprising:
at least one processor; and
memory storing instructions configured to be executed by the at least one processor, the instructions, when executed by the at least one processor, causing the at least one processor to perform a method comprising:
receiving a request to generate a new color lookup table, the request including at least one parameter value indicating a parameter change input by a user, the request indicating a number of data-points in the new color lookup table;
generating a new color value for each of the data-points based on the at least one parameter value, the new color value being stored as a Red Green Blue Alpha ("RGBA") vector;

appending the new color value generated for each of the data-points to a data structure, the data structure being a linear RGBA matrix; and generating the new color lookup table from the data structure, the new color lookup table being operable to replace a current color lookup table.

46. The mobile communication device of claim 45, further comprising:

a camera configured to capture at least one digital image and store the at least one digital image in the memory; and a display device, wherein the method further comprises generating at least one modified image by using the new color lookup table to replace colors of the at least one digital image, and displaying the at least one modified image on the display device.

47. The mobile communication device of claim 45, wherein the parameter change input by the user implements a pixel transform operation comprising at least one of a gamma curve remap, histogram equalization, a vibrance modification, a contrast modification, a temperature modification, a tint modification, a custom cinematic filter, and an RGB matrix operation.

48. The mobile communication device of claim 45, wherein the request specifies a size and a precision of the new color lookup table.

49. The mobile communication device of claim 45, wherein the number of data-points is a second number of data-points, the current color lookup table has a first number of data-points, and the first number of data-points is different from the second number of data-points.

50. The mobile communication device of claim 45, wherein the new color value is generated for each of at least a portion of the data-points in parallel.

51. An image capture system comprising:

at least one processor; and memory storing instructions configured to be executed by the at least one processor, the instructions, when executed by the at least one processor, causing the at least one processor to perform a method comprising:

receiving a request to generate a new color lookup table, the request including at least one parameter value indicating a parameter change input by a user, the request indicating a number of data-points in the new color lookup table, the parameter change input by the user implementing a pixel transform operation comprising at least one of a gamma curve remap, histogram equalization, a vibrance modification, a contrast modification, a temperature modification, a tint modification, a custom cinematic filter, and an RGB matrix operation;

generating a new color value for each of the data-points based on the at least one parameter value, the new color value being stored as a Red Green Blue ("RGB") vector;

appending the new color value generated for each of the data-points to a data structure, the data structure being a linear RGB matrix; and generating the new color lookup table from the data structure, the new color lookup table being operable to replace a current color lookup table.

52. The image capture system of claim 51, further comprising:

a camera configured to capture at least one digital image and store the at least one digital image in the memory; and a display device, wherein the method further comprises generating at least one modified image by using the new color lookup table to replace colors of the at least one digital image, and displaying the at least one modified image on the display device.

53. The image capture system of claim 51, wherein the request specifies a size and a precision of the new color lookup table.

54. The image capture system of claim 51, wherein the number of data-points is a second number of data-points, the current color lookup table has a first number of data-points, and the first number of data-points is different from the second number of data-points.

55. The image capture system of claim 51, wherein the new color value is generated for each of at least a portion of the data-points in parallel.

56. An image capture system comprising:

at least one processor; and memory storing instructions configured to be executed by the at least one processor, the instructions, when executed by the at least one processor, causing the at least one processor to perform a method comprising:

receiving a request to generate a new color lookup table, the request including at least one parameter value indicating a parameter change input by a user, the request indicating a number of data-points in the new color lookup table;

generating a new color value for each of the data-points based on the at least one parameter value, the new color value being stored as a Red Green Blue Alpha ("RGBA") vector;

appending the new color value generated for each of the data-points to a data structure, the data structure being a linear RGBA matrix; and generating the new color lookup table from the data structure, the new color lookup table being operable to replace a current color lookup table.

57. The image capture system of claim 56, further comprising:

a camera configured to capture at least one digital image and store the at least one digital image in the memory; and a display device, wherein the method further comprises generating at least one modified image by using the new color lookup table to replace colors of the at least one digital image, and displaying the at least one modified image on the display device.

58. The image capture system of claim 56, wherein the parameter change input by the user implements a pixel transform operation comprising at least one of a gamma curve remap, histogram equalization, a vibrance modification, a contrast modification, a temperature modification, a tint modification, a custom cinematic filter, and an RGB matrix operation.

59. The image capture system of claim 56, wherein the request specifies a size and a precision of the new color lookup table.

60. The image capture system of claim 56, wherein the number of data-points is a second number of data-points, the current color lookup table has a first number of data-points, and the first number of data-points is different from the second number of data-points.

61. The image capture system of claim 56, wherein the new color value is generated for each of at least a portion of the data-points in parallel.

62. An image capture system comprising:
    at least one processor; and
    memory storing instructions configured to be executed by the at least one processor, the instructions, when executed by the at least one processor, causing the at least one processor to perform a method comprising:
    receiving a request to generate a new color lookup table, the request including at least one parameter value indicating a parameter change input by a user, the request indicating a number of data-points in the new color lookup table, the parameter change input by the user implementing a pixel transform operation comprising at least one of a gamma curve remap, histogram equalization, a vibrance modification, a contrast modification, a temperature modification, a tint modification, a custom cinematic filter, and an RGB matrix operation;
    generating a new color value for each of the data-points based on the at least one parameter value;
    appending the new color value generated for each of the data-points to a data structure; and
    generating the new color lookup table from the data structure, the new color lookup table being operable to replace a current color lookup table.

63. The image capture system of claim 62, further comprising:
    a camera configured to capture at least one digital image and store the at least one digital image in the memory; and
    a display device, wherein the method further comprises generating at least one modified image by using the new color lookup table to replace colors of the at least one digital image, and displaying the at least one modified image on the display device.

64. The image capture system of claim 62, wherein the request specifies a size and a precision of the new color lookup table.

65. The image capture system of claim 62, wherein the number of data-points is a second number of data-points,
    the current color lookup table has a first number of data-points, and
    the first number of data-points is different from the second number of data-points.

66. The image capture system of claim 62, wherein the new color value is generated for each of at least a portion of the data-points in parallel.

67. A method comprising:
    receiving, by a module executing on a computing device, a request to generate a new color lookup table, the request including at least one parameter value indicating a parameter change input by a user, the request indicating a number of data-points in the new color lookup table, the new color lookup table being associated with a color space, the number of data-points in the new color lookup table being fewer than a number of colors in the color space, the parameter change input by the user implementing a pixel transform operation comprising at least one of a gamma curve remap, histogram equalization, a vibrance modification, a contrast modification, a temperature modification, a tint modification, a custom cinematic filter, and an RGB matrix operation;
    generating, by the module, a new color value for each of the data-points based on the at least one parameter value;
    appending, by the module, the new color value for each of the data-points to a data structure; and
    generating, by the module, the new color lookup table from the data structure, the new color lookup table being operable to replace a current color lookup table.

68. The method of claim 67, further comprising:
    transmitting, by the module, the new color lookup table to an external process configured to generate at least one modified image by using the new color lookup table to replace colors of at least one digital image.

69. The method of claim 68, further comprising:
    displaying, by the external process, the at least one modified image on a display device.

70. The method of claim 68, further comprising:
    receiving, by the external process, the parameter change input by the user;
    formulating, by the external process, the request; and
    sending, by the external process, the request to the module.

71. The method of claim 67, wherein the new color value is stored as a Red Green Blue ("RGB") vector and the data structure is a linear RGB matrix.

72. The method of claim 67, wherein the request specifies a size and a precision of the new color lookup table.

73. The method of claim 67, wherein the number of data-points is a second number of data-points,
    the current color lookup table has a first number of data-points, and
    the first number of data-points is different from the second number of data-points.

74. The method of claim 67, wherein the module generates the new color value for each of at least a portion of the data-points in parallel.

75. A mobile communication device comprising:
    at least one processor; and
    memory storing instructions configured to be executed by the at least one processor, the instructions, when executed by the at least one processor, causing the at least one processor to perform a method comprising:
    receiving a request to generate a new color lookup table, the request including at least one parameter value indicating a parameter change input by a user, the request indicating a number of data-points in the new color lookup table, the parameter change input by the user implementing a pixel transform operation comprising at least one of a gamma curve remap, histogram equalization, a vibrance modification, a contrast modification, a temperature modification, a tint modification, a custom cinematic filter, and an RGB matrix operation;
    generating a new color value for each of the data-points based on the at least one parameter value;
    appending the new color value generated for each of the data-points to a data structure; and
    generating the new color lookup table from the data structure, the new color lookup table being operable to replace a current color lookup table.

76. The mobile communication device of claim 75, further comprising:
    a camera configured to capture at least one digital image and store the at least one digital image in the memory; and
    a display device, wherein the method further comprises generating at least one modified image by using the new color lookup table to replace colors of the at least one digital image, and displaying the at least one modified image on the display device.

77. The mobile communication device of claim 75, wherein the new color value is stored as a Red Green Blue ("RGB") vector and the data structure is a linear RGB matrix.

78. The mobile communication device of claim 75, wherein the request specifies a size and a precision of the new color lookup table.

79. The mobile communication device of claim 75, wherein the number of data-points is a second number of data-points,
   the current color lookup table has a first number of data-points, and
   the first number of data-points is different from the second number of data-points.

80. The mobile communication device of claim 75, wherein the new color value is generated for each of at least a portion of the data-points in parallel.

* * * * *